United States Patent [19]

Kuo et al.

[11] Patent Number: 4,923,909

[45] Date of Patent: May 8, 1990

[54] METHOD FOR THE SUSPENSION OF PLASTIC ADDITIVES WITH RHEOLOGY AGENTS

[75] Inventors: Charles C. Kuo, Avon Lake; Robert M. Gengarelly, Wadsworth, both of Ohio

[73] Assignee: The B. F. Goodrich Company, Akron, Ohio

[21] Appl. No.: 772,113

[22] Filed: Sep. 3, 1985

[51] Int. Cl.$^5$ ................................................ C08K 3/04
[52] U.S. Cl. .................................................... 523/333
[58] Field of Search ........................................ 523/333

[56] References Cited

U.S. PATENT DOCUMENTS

| | | | |
|---|---|---|---|
| 3,085,988 | 4/1963 | Hull et al. | 523/333 |
| 3,257,351 | 6/1966 | Kraus et al. | 523/333 |
| 3,380,784 | 4/1968 | Yingst et al. | 523/333 |
| 3,432,462 | 3/1969 | Gignilliat et al. | 523/333 |
| 3,637,571 | 1/1972 | Polovina | 523/333 |
| 3,678,047 | 7/1972 | Kletecka et al. | 546/220 |
| 4,001,367 | 1/1977 | Guthrie et al. | 523/333 |
| 4,073,770 | 2/1978 | Son et al. | 524/925 |

*Primary Examiner*—Joseph L. Schofer
*Assistant Examiner*—N. Sarofim
*Attorney, Agent, or Firm*—Daniel J. Hudak; Nestor W. Shust

[57] ABSTRACT

A method wherein polymer stabilizers are suspended in a liquid carrier through the use of rheology agents so that a slurry is formed. The slurry can be stored with little or no setting of the stabilizers until needed and then transferred and applied to a polymer such as a thermoplastic polymer. Inasmuch as the slurry is often thixotropic, it can be readily transferred as upon the application of a pumping force thereto. Typically, the polymer can be treated upon the manufacture thereof or immediately thereafter. Polymers so treated have improved storage and processing stablity. Moreover, the stability of the final product is improved.

19 Claims, No Drawings

METHOD FOR THE SUSPENSION OF PLASTIC ADDITIVES WITH RHEOLOGY AGENTS

FIELD OF THE INVENTION

The present invention relates to the suspension of stabilizer agents in a liquid carrier through the use of rheology compounds. It further relates to an efficient stabilizer treatment of polymers, such as, thermoplastic polymers.

PRIOR ART

Heretofore, various additives have generally been applied to substrates as by mixing. Thus, in the rubber industry, additives have been blended with elastomers generally by mixing under high shear as in a Banbury, a two-roll mill, or the like. Typically, in the plastic industry plastics have been stabilized through the addition of additives thereto in a mixing device such as an extruder.

Another method of applying stabilizer additives to plastics utilized melt or solution techniques. Thus, various polymers have been melted and the additives added thereto and blended therewith. This method not only required melting of the polymer, blending the additive therewith, but also cooling the polymer and forming a suitable useful product such as pellets. High energy requirements were thus necessary and furthermore this method was time consuming. In the solution method, many additives were not soluble in desired solvents and hence could not be applied.

SUMMARY OF THE INVENTION

Accordingly, it is an aspect of the present invention to provide an efficient method for applying stabilizers to a polymer as, for example, upon the manufacture thereof or immediately thereafter. Since the stabilizer slurries of the present invention are desirably thixotropic, they can be readily transferred through pipes, and the like. A method of applying a stabilizer to a polymer comprises suspending the stabilizer in a volatile liquid carrier with an effective amount of a rheology additive, applying the mixture to the polymer and removing the liquid carrier so that said polymer contains said stabilizer.

A treated thermoplastic polymer has a plastic additive applied thereto from a slurry, the slurry comprising said plastic additive and a volatile liquid carrier as well as an effective amount of a rheology agent so that the plastic agent is substantially suspended in the liquid carrier.

The invention also relates to a plastic additive slurry comprising, at least one stabilizer in a volatile liquid carrier, said carrier having an effective amount of a rheology agent to form the slurry whereby said stabilizer is suspended therein.

PREFERRED EMBODIMENTS

According to the present invention, various types of plastic additives are applied to a variety of polymers and especially to thermoplastic polymers. The plastic additives utilized are generally solid as well as insoluble or partially insoluble in the volatile liquid carrier. One suitable type of plastic additives includes protective materials, that is antioxidants, antiozonants, ultraviolet light stabilizers, inhibitors and absorbers, chemical and heat stabilizers, anti-blocking agents, antiflex cracking agents, antislip agents, antistatic agents, flame retarders, fungicides, germicides, heat sensitizers, optical brighteners, and the like. Also included within protective materials are secondary stabilizers. That is, phosphorous or sulfur containing compounds which aid the various protective materials in achieving their function and often produce a synergistic result therewith. Such compounds are well known to the art and set forth in various literature. An example of a few such additives include AgeRite MA, polymerized 1,2-dihydro-2,2,4-trimethylquinoline, manufactured by R. T. Vanderbilt, an antioxidant for polyethylene; Antioxidant 431, a hindered phenol manufactured by Uniroyal Chemicals, an antioxidant for nylon, polyolefins, and the like; Distearyl thiodipropionate manufactured by Aceto Chem, an antioxidant; Ferro AM 101, a complex nickel compound manufactured by Ferro Corporation, a light stabilizer for polyolefins; Ferro Permyl B-100, a benzophenone compound manufactured by Ferro, a vinyl ultraviolet absorber; the various antimony oxides which are utilized as flame retardants especially in polyvinyl chloride; a slip agent especially for polyethylenes such as Lubrol RO-O, oleamide, manufactured by ICI Organics, and the like.

Another type of plastic additive are processing agents which include plasticizers, softeners, peptizers, processing aids and dispersing agents. Various types of processing agents are well known to the art as well as to the literature. A few very specific examples include mercapto acetic acid esters produced by Gallard-Schlesinger Chemical, a plasticizer and stabilizer; triphenyl phosphate which is used for natural and synthetic resins as a plasticizer or softener; and Unichlor, a chlorinated paraffin manufactured by Neville Chemical, a plasticizer, softener, and flame retardant for natural and synthetic resins.

Another type of plastic additive are the various extenders, fillers, and reinforcing materials such as carbon black, various types of calcium carbonates, various types of silica, such as hydrated silica, hydrated aluminum silicate, clays, various types of aluminum silicates, and the like.

Various coloring materials constitute yet another class of plastic additives and include inorganic colors, organic colors, pigments, and the like.

Still another type of plastic additive are the auxiliary and surface materials such as adhesives, bonding and sealing agents, blowing agents, blow promoters, dusting, dipping and washing materials, odorants and antistaining agents, mold and internal lubricants, polymerization materials such as catalysts, chain extenders, cross-linking agents, dispersing agents, emulsifiers, modifiers, polymerization accelerators, polymerization activators, polymerization inhibitors, reducing agents, shortstops, terminators, and the like.

The above plastic additives are well known to the art and to the literature. For example, a source of such numerous compounds can be obtained from any of the Rubber World editions, published yearly by Bill Communications, Inc., New York, New York. Another source of numerous plastic additives is the various editions of Modern Plastics Encyclopedia, McGraw-Hill, Inc., New York, New York.

According to the present invention, preferred plastic additives include thermoplastic polymer stabilizers such as antioxidants, ultraviolet light stabilizers, inhibitors or absorbers, anti-ozonates, and heat and chemical stabilizers.

Considering the antioxidants, a desirable class includes the phenolic antioxidants. Examples of such antioxidants include 2,6-di-t-butylphenol; 2-methyl-4,6-dinonyl phenol; 2,6-di-t-butyl-p-cresol; 2,2'-methylenebis(4-methyl-6-t-butyl phenol); 1,1'-methylenebis(2-naphthol); 4,4'-methylenebis(2,6-di-t-butyl phenol); 4,4'-thiobis(6-t-butyl-m-cresol); and the like. Another suitable class of phenolic antioxidants are those having an alkylhydroxyphenyl substituent on an ester or a heterocyclic nucleus. Such a substituted phenolic antioxidant has the formula

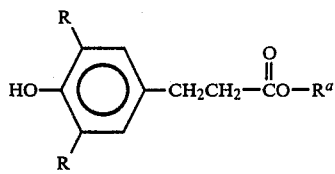

wherein R is hydrogen or an alkyl group of 1 to 9 carbon atoms, where at least one R must be an alkyl group, and $R^a$ is an alkyl group of 1 to 18 carbon atoms, exemplified by octadecyl 3-(3',5'-di-t-butyl-4'-hydroxyphenyl)propionate (see U.S. Pat. No. 3,330,859 for other examples). Other alkylhydroxyphenyl substituted antioxidants are set forth in U.S. Pat. No. 3,627,725 which is hereby fully incorporated by reference and is exemplified by di-lauryl α,α'-bis(3,5-di-t-butyl-4-hydroxybenzyl)malonate; compounds as set forth in British Patent No. 977,589 as exemplified by 2,4,6-tris(4-hydroxy-3,5-di-t-butylbenzylthio)-1,3,5-triazine; compounds as set forth in U.S. Pat. No. 3,706,740 which is hereby fully incorporated by reference as exemplified by 2,4,6-tris(3',5'-di-t-butyl-4'-hydroxybenzyl)-1,3,5-triazine; compounds as set forth in U.S. Pat. No. 3,567,724 which is hereby fully incorporated by reference and exemplified by hexahydro-1,3,5-tris-β-(3,5-di-t-butyl-4-hydroxyphenyl)propionyl-s-triazine; compounds as set forth in U.S. Pat. No. 3,694,440 which is hereby fully incorporated by reference and exemplified by 1,3,5-tris(4'-hydroxy-3',5'-di-t-butylphenylpropionyloxyethylthiopropionyl)hexahydro-1,3,5-triazine; compounds as set forth in U.S. Pat. No. 3,531,483 as exemplified by tris-(3,5-di-t-butyl-4-hydroxybenzyl)isocyanurate; compounds as set forth in U.S. Pat. No. 3,678,047 which is hereby fully incorporated by reference as exemplified by 2,2',2''-tris(3-(3,5-di-t-butyl-4-hydroxyphenyl)propionyloxy)ethyl isocyanurate; and the like.

Another suitable class of generally insoluble antioxidants which can be utilized in the present invention are esters containing an alkylhydroxyphenyl group and alkyl esters of carboxylic acids containing an alkylhydroxyphenyl group as set forth in U.S. Pat. Nos. 3,285,855 and 3,330,859, respectively, and are hereby fully incorporated by reference with regard to such antioxidants. These patents are further fully incorporated by reference with regard to the formulations set forth therein as well as the method of preparation. Exemplary of such antioxidants of U.S. Pat. No. 3,285,855 are n-octadecyl 3,5-di-t-butyl-4-hydroxyphenylacetate; n-octadecyl 3,5-di-t-butyl-4-hydroxybenzoate; n-hexyl 3,5-di-t-butyl-4-hydroxyphenylbenzoate; n-dodecyl 3,5-di-t-butyl-4-hydroxyphenylbenzoate; neododecyl 3-(3,5-di-t-butyl-4-hydroxyphenyl)propionate; dodecyl β-(3,5-di-t-butyl-4-hydroxyphenyl)propionate; ethyl-(4-hydroxy-3,5-di-t-butylphenyl)-isobutyrate; octadecyl α-(4-hydroxy-3,5-di-t-butylphenyl)isobutyrate; octadecyl α-(4-hydroxy-3,5-di-t-butylphenyl)isobutyrate; and n-octadecyl-β-(3,5-di-t-butyl-4-hydroxyphenyl)propionate; 2-(n-octylthio)ethyl 3,5-di-t-butyl-4-hydroxybenzoate; 2-(n-octylthio)ethyl 3,5-di-t-butyl-4-hydroxyphenylacetate; 2-(n-octadecylthio)ethyl 3,5-di-t-butyl-4-hydroxyphenylacetate; 2-(n-octadecylthio)ethyl 3,5-di-t-butyl-4-hydroxybenzoate; 2-(2-hydroxyethylthio)ethyl 3,5-di-t-butyl-4-hydroxybenzoate; β,β'-thiodiethyl bis-(3,5-di-t-butyl-4-hydroxyphenylacetate); diethylene glycol bis-[3-(3,5-di-t-butyl-4-hydroxyphenyl)propionate]; 2-(n-octadecylthio)ethyl 3-(3,5-di-t-butyl-4-hydroxyphenyl)propionate; thio-bis-[ethylene 3-(3,5-di-t-butyl-4-hydroxyphenyl)propionate]; n-butylimino N,N-bis-[ethylene-3-(3,5-di-t-butyl-4-hydroxyphenyl)propionate]; 2-(2-stearoyloxyethylthio)ethyl 3,5-di-t-butyl-4-hydroxybenzoate; 2-(2-hydroxyethylthio)ethyl 7-(3-methyl-5-t-butyl-4-hydroxyphenyl)heptanoate; 2-(2-stearoyloxyethylthio)ethyl 7-(3-methyl-5-t-butyl-4-hydroxyphenyl)heptanoate; 1,2-propylene glycol bis-[3-(3,5-di-t-butyl-4-hydroxyphenyl)-propionate]; ethylene glycol bis-[3-(3,5-di-t-butyl-4-hydroxyphenyl)propionate]; neopentylglycol bis-[3-(3,5-di-t-butyl-4-hydroxyphenyl)propionate]; ethylene glycol bis-(3,5-di-t-butyl-4-hydroxyphenylacetate); glycerine-1-n-octadecanoate-2,3-bis-(3,5-di-t-butyl-4-hydroxyphenylacetate); tetra-[methylene 3-(3,5-di-t-butyl-4-hydroxyphenyl)propionate]methane; n-propyl 1,1,1-tris-[methylene 3-(3,5-di-t-butyl-4-hydroxyphenyl)propionate]; sorbitol hexa-[3(3,5-di-t-butyl-4-hydroxyphenyl)propionate]; 1,2,3-butanetriol tris-[3-(3,5-di-t-butyl-4-hydroxyphenyl)propionate]; 2-hydroxyethyl 7-(3-methyl-5-t-butyl-4-hydroxyphenyl)heptanoate; 2-stearoyloxyethyl 7-(3-methyl-5-t-butyl-4-hydroxyphenyl)heptanoate; and n-ethyl 1,1,1-tris[methylene 3-(3,5-di-t-butyl-4-hydroxyphenyl)propionate].

Desirable antioxidants of the U.S. Pat. No. 3,330,859 include compounds having the formula

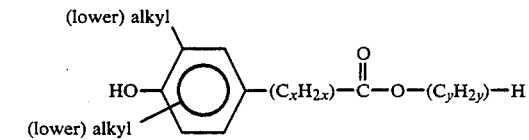

in which x has a value of from 0 to 6 inclusively and y has a value of from 6 to 30 inclusively; compounds of the formula

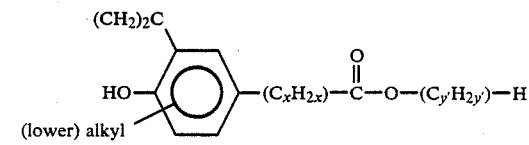

in which x has a value of from 0 to 6 inclusively and y' has a value of from 6 to 20 inclusively; compounds of the formula

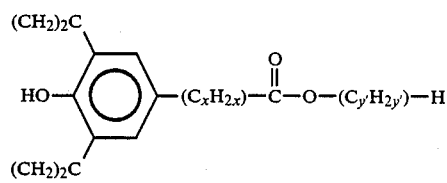

in which x has a value of from 0 to 6 inclusively and y' has a value of from 6 to 20 inclusively; as well as n-octadecyl 3,5-di-t-butyl-4-hydroxyphenylacetate; neododecyl 3-(3,5-di-t-butyl-4-hydroxyphenyl)propionate; dodecyl β-(3,5-di-t-butyl-4-hydroxyphenyl)propionate; ethyl α-(4-hydroxy-3,5-di-t-butylphenyl)isobutyrate; octadecyl α-(4-hydroxy-3,5-di-t-butylphenyl)isobutyrate; octadecyl α-(4-hydroxy-3,5-di-t-butylphenyl)propionate; n-octadecyl β-(3,5-di-t-butyl-4-hydroxyphenyl)propionate, and the like.

Another type of antioxidant which is preferred are the hydroxylphenylalkylenyl isocyanurates. These compounds are generally represented by the formula

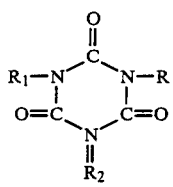

wherein R is a hydroxyphenylalkyleneyl radical having the formula

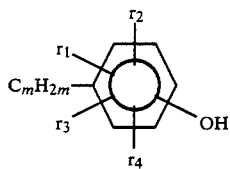

wherein m is an integer from 1 to 4, $r_1$ is an alkyl group, either aliphatic or cycloaliphatic, containing from 1 to 18 carbon atoms and positioned immediately adjacent to the hydroxyl group on the ring, and $r_2$, $r_3$ and $r_4$ are hydrogen or an aliphatic or cycloaliphatic group containing from 1 to 18 carbon atoms; and $R_1$ and $R_2$ are hydrogen or the same as R above. Especially useful isocyanuric acid esters are those compounds wherein two, and more preferably all, of the R groups are hydroxyphenylalkyleneyl radicals wherein $r_1$ is a t-alkyl group containing from 4 to 12 carbon atoms, $r_2$ is an alkyl group containing from 1 to 12 carbon atoms, $r_3$ and $r_4$ are hydrogen and m is 1, such as the 3,5-di-t-butyl-4-hydroxybenzyl radical, 3-methyl-5-t-butyl-4-hydroxybenzyl radical, 2-methyl-5-t-butyl-4-hydroxybenzyl radical, 3-t-butyl-5-methyl-2-hydroxybenzyl radical or like radicals.

Such compounds are excellent stabilizers for organic materials generally subjected to oxidative, thermal and ultraviolet degradation as for example olefin homopolymers and copolymers. Generally, the symmetrical tris-(3,5-di-t-alkyl-4-hydroxylbenzyl)isocyanurates are desired and specific examples thereof include tris-(3-methyl-4-hydroxybenzyl)isocyanurate, tris-(3-t-butyl-4-hydroxybenzyl)isocyanurate, tris-(3-t-amyl-4-hydroxybenzyl)isocyanurate, tris-(3-octyl-4-hydroxybenzyl)isocyanurate, tris-(3,5-dimethyl-4-hydroxybenzyl)isocyanurate, tris-(3,5-diisopropyl-4-hydroxybenzyl)isocyanurate, tris-(3-methyl-5-isobornyl-4-hydroxybenzyl)isocyanurate, tris-(3-cyclohexyl-4-hydroxybenzyl)isocyanurate, tris-(3,5-di-t-butyl-4-hydroxybenzyl)isocyanurate, tris-3-t-butyl-5-t-amyl-4-hydroxybenzyl)isocyanurate, tris-(3,5-di-t-amyl-4-hydroxybenzyl)isocyanurate, tris-[3,5-di-(1-methyl-1-ethylpropyl)-4-hydroxybenzyl]isocyanurate, tris[3,5-di-(1,1,2,2-tetramethylpropyl)-4-hydroxybenzyl]isocyanurate, tris-[3,5-di-(1-dimethylpentyl)-4-hydroxybenzyl]isocyanurate, bis-(3-methyl-4-hydroxybenzyl)isocyanurate, bis-(3-t-butyl-4-hydroxybenzyl)isocyanurate, bis-(3,5-dimethyl-4-hydroxybenzyl)isocyanurate, bis-(3,5-di-t-butyl-4-hydroxybenzyl)isocyanurate, 3-methyl-4-hydroxybenzyl isocyanurate, 3-t-butyl-4-hydroxybenzyl isocyanurate, 3,5-dimethyl-4-hydroxybenzyl isocyanurate, 3,5-di-t-butyl-4-hydroxybenzyl isocyanurate and the like. It is not necessary that the ester substituents on the isocyanuric acid be identical, however, preparatively it is generally easier to obtain compounds wherein all the substituents are the same. Such compounds as well as other preferred antioxidants are set forth in U.S. Pat. No. 3,531,483 which is hereby fully incorporated by reference, especially with regard to the type and preparation of such compounds.

Yet another desirable plastic additive which is an excellent stabilizer, generally as an antioxidant, are compounds represented by the general formula

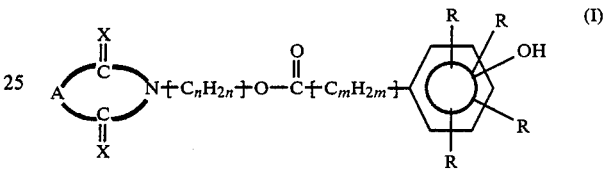

wherein n is an integer from 1 to 12, m is an integer from 0 to 8, R is hydrogen or a hydrocarbon radical containing from 1 to 12 carbon atoms, X is oxygen or sulfur and A is a bivalent molecular grouping. The bivalent radical A may be a hydrocarbon radical, such as alkylene or phenylene, or may contain one or more heteroatoms or other functional groups, such as

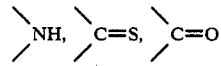

or the like. In the latter instance where more than one NH group is present in the ring it will be possible to prepare compounds containing a plurality of alkylhydroxyphenyl groups. While R is preferably hydrogen or a hydrocarbon radical, it may be any other group capable of being substituted on an aromatic ring, such as halogen or a nitro group. Compounds of formula I which are especially useful for the present invention are those wherein X is oxygen, n is an integer from one to eight, m is an integer from one to four and the hydroxyl group is in the 4-position on the ring and is hindered, i.e., has positioned on the ring immediately adjacent thereto at least one alkyl group containing from one to 12 carbon atoms. For specific types of nitrogen heterocyclic groups as well as specific compounds useful as stabilizers, particularly the derivatives of isocyanuric acid, reference is hereby made to U.S. Pat. No. 3,678,047 which is hereby fully incorporated by reference, not only with regard to the specific types of such compounds, but also with regard to their preparation.

Naturally, other antioxidants can be utilized which are well known to the art or the literature and include the various conventional phenolic amines and the like.

With regard to ultraviolet light stabilizers, numerous different types can be utilized such as those known to the art as well as contained in the literature. As a specific example, substituted decahydroquinolines can be utilized as set forth in U.S. Pat. No. 4,073,770 hereby fully incorporated by reference. Other examples of conventional ultraviolet light stabilizers include the various benzophenones, the various benzotriazoles, the various benzoates, the various hindered amines, and the like.

Various anti-ozonates can also be utilized as is well known to the art and to the literature. With regard to suitable anti-ozonates, generally they include petroleum waxes, both amorphous and microcrystalline, secondary aromatic amines such as N,N-diphenyl-para-phenylenediamine, quinoline, and furan derivatives. Naturally, numerous other types exist and although not listed are well known to the literature and therefore included herein for the sake of brevity.

With regard to the heat and process stabilizers, once again numerous compounds exist which are known to the art as well as to the literature. Specific general types include various phenol-formaldehyde resins, various calcium-zinc organic compounds, various barium-cadmium compounds, various barium-zinc compounds, and the like.

The secondary stabilizers, so referred to inasmuch as they enhance the effect of the above noted protective materials and often impart synergistic results thereto are generally known to the art as well as to the literature. Specific examples include phosphorous or sulfur containing compounds and include the various triazines, as well as various sulfur containing stabilizers such as dilaurylthiodipropionate, distearylthiodipropionate, and the like.

As discussed above, the present invention preferably relates to stabilizers such as antioxidants, ultraviolet light stabilizers, heat and process stabilizers, anti-ozonates, and secondary stabilizers. However, it also relates to numerous other generally insoluble plastic additives as noted above including flame retardants, fungicides, germicides, various processing types of additives, various filters such as carbon black, talc, calcium carbonate, silica, and the like, various coloring materials, and various axillary and surface material additives.

The various types of polymers which can be utilized in the present invention include natural and synthetic polymers well known to the art and literature and include thermoset polymers, thermoplastic rubbers and especially thermoplastic polymers. By way of exemplary material, the following polymers are listed: homopolymers of ethylene, propylene, butene, isobutylene, pentene, hexene, and the like including various isomers thereof and copolymers such as ethylene-propylene copolymer, a copolymer of ethylene and butene-1, and the like. Other suitable polymers include ethylene-propylene terpolymers (EPDM) wherein the third monomer is a diene. The diene can be 1,4-hexadiene, vinylnorbornene, ethylidenenorbornene, methylenenorbornene, and the like. The polyacetal resins such as homopolymers of formaldehyde constitute another class of polymers. The various polyesters which are generally obtained by condensation of various dibasic acids such as maleic, fumaric, terephthalic, isophthalic acid, adipic acid, azaleic acid, sebacic and the like with a glycol such as ethylene glycol, propylene glycol, neopentyl glycol and the like, can also be utilized. Still another class of polymers are the various polyurethanes made from a glycol such as trimethyl propane glycol, butanediol, or a polyol derived from a polyester, a polyether, or a derivative of a polycaprolactone, with a polyisocyanate such as an aliphatic diisocyanate or preferably an aromatic diisocyanate or an isocyanate-terminated prepolymer. The nylons or polyamides can also be utilized such as polycaprolactan or those obtained between the condensation of dicarboxylic acid such as adipic or sebacic acid reacted with a diamine compound such as hexamethylenediamine or the like. Still another class of polymers are those made from the various vinyl substituted aromatic monomers such as polystyrene. Another class of polymers are those derived from conjugated dienes such as polybutadiene, polyisoprene, copolymers of butadiene and styrene, acrylonitrile, acrylic acid, alkyl acrylates or methacrylates, methylvinyl ketone, vinyl pyridine, or the like and include the various acrylonitrile-butadiene-styrene copolymers (ABS). Various vinyl polymers can also be utilized such as polyvinyl chloride, polyvinyl fluoride, polyvinylidene chloride, polyvinyl acetate, copolymers of vinyl chloride with vinylidene chloride, styrene, various vinyl esters, acrylic or methacrylic acid, or other alpha, beta-olefinically unsaturated acids and esters thereof such as alkyl acrylates and methacrylates. Another class of polymers include homopolymers and copolymers of acrylic monomers such as acrylic acid, methacrylic acid, methyl methacrylate, ethyl acrylate, acrylamide, methacrylamide, acrylonitrile, and the like. Still another class of polymers include the various polycarbonates. Inasmuch as this list is not meant to be exhaustive, other polymers and especially thermoplastic polymers well known to the art as well as the literature are included herein, especially polymeric systems subject to degradation as a result of oxidative thermal or photochemical effects and which can be stabilized by stabilizing additives.

Although not preferred, various thermoset polymers can be utilized as known to the art and the literature. Examples include the various phenolic resins, the various amino resins, the various epoxy resins, the various unsaturated polyester resins, the various urethane foams, the various silicone polymers, and the like. Another class of non-preferred polymers includes the various thermoplastic rubbers known to the art and literature such as the various Kratons manufactured by Shell Chemical.

Desirable thermoplastic polymers which are treated according to the present invention with the plastic additive slurry are alpha-monoolefin homopolymers, copolymers and terpolymers such as polyethylene, polypropylene, high and low density polyethylene, polyisobutylene, ethylenepropylene copolymers, ethylene-propylene terpolymers containing generally less than 10% by weight of a third monomer containing multiple unsaturation therein, polyacetal homopolymers and copolymers, polyamides, polyesters, polystyrene, polycarbonate, polyvinyl chloride and ABS copolymers. The present invention is particularly suitable to treatment of polyethylene and polypropylene.

The liquid carrier of the present invention to which the plastic additives, for example the plastic stabilizers, are added, can be aqueous or an organic liquid. Inasmuch as a volatile liquid carrier is desired so that it can readily be evaporated, organic liquids are generally preferred. The organic liquid carriers can be aliphatic, aromatic, aliphatic substituted aromatic, and the like, as well as derivatives thereof such as alcohols, aldehydes, ketones, ethers, organic halides, etc. Examples of aliphatic hydrocarbons include the various alkanes such as those having from about 6 to about 12 carbon atoms with specific examples including hexane, heptane, decane, dodecane, and the like. The aromatic hydrocarbons generally have from about 6 to about 14 carbon atoms and include alkyl substituted aromatics. Examples of aromatic carriers include benzene, xylene, toluene, and the like. Alkyl halides having from 1 to 5 carbon atoms can be used such as ethyl chloride, ethyl bromide, propyl chloride, dichloromethane, chloroform, carbon tetrachloride, and the like. Yet another suitable class of organic liquid compounds includes the various alkyl alcohols such as methyl alcohol, ethyl alcohol, propyl alcohol, isopropyl alcohol, and the like. Generally the alcohols contain from 1 to about 5 carbon atoms. The liquid carrier can also be an aldehyde having from 1 to about 5 carbon atoms such as acetaldehyde, a ketone having from 3 to about 5 carbon atoms such as butone, or an ether having from about 2 to about 5 carbon atoms such as isopropyl ether, tetrahydrofuran, and the like. Many other organic liquid carriers can be utilized as should be appreciated by those skilled in the art. The general requisite for the carrier is that it be a liquid and generally be volatile. By the term volatile is meant that the liquid carrier readily evaporates. Of course, evaporation can be hastened as by the application of heat or by applying a vacuum thereto. Generally, suitable volatile liquid carriers have a boiling point of approximately 120° C. or less, desirably 100° C. or less and preferably 70° C. or less. As previously noted, the plastic additives are generally insoluble or partially soluble in the liquid carrier. By partially soluble is meant that only up to about 30% by weight of the plastic additive is soluble in the liquid carrier and desirably less than 10% by weight of said additive is soluble.

The amount of liquid carrier utilized is generally sufficient so that a plastic additive slurry of fairly high concentration is obtained. Naturally, the amount of insoluble plastic additives in the liquid carrier can vary over a wide range depending upon the type of liquid carrier, plastic additive material, and the like. As a general rule of thumb, the plastic slurry mixture can contain from about 1% to about 60% by weight of the plastic additive, desirably from about 5% to about 50% by weight, and preferably from about 10% to about 40% by weight based upon the weight of the slurry, that is, the liquid carrier, the plastic additive and the rheology agent.

It is an important aspect of the present invention to use rheology agents which suspend the plastic additives in the liquid carrier and prevent them from settling. It is another important aspect of the present invention to use rheology agents which permit the slurry to be easily transferred as by pumping. Various types of rheology agents can be utilized, especially thickeners and preferably thixotropic agents. Thixotropic agents exhibit time-dependent effects. Thus, a thixotropic fluid will either exhibit a decrease in viscosity with time when sheared at a constant shear rate or will exhibit a decrease in viscosity with an increase in shear rate. Accordingly, such agents will adequately suspend the plastic additives in solution until a shear force is applied thereto as by pumping, spraying or other processing step whereupon they readily flow. The plastic additive slurries of the present invention are thus ideally suitable for use in transferring equipment such as pipes, tanks, containers, storage areas and the like in that the additive is retained in liquid yet, when desired, can readily be transferred from one area to another.

Although the type and amount of rheology agents can vary widely, the basic requirement is utilization of an effective amount of a specific type to substantially suspend a particular plastic additive in a particular liquid carrier. By an effective amount is generally meant an amount of the rheology agent which generally maintains at least 60%, desirably 70%, more desirably 80% and preferably 90 or 95% of the original slurry liquid level during a 24 hour period.

Often commercial plastic additives are of a very small particle size. Ordinarily, the average particle size is about 100 microns or less with the largest particle size being no greater than about 1,000 microns. Desirably, the average particle size is about 50 microns or less with the largest particle being no greater than 500 microns. Preferably, the average particle size is 10 microns or less with the largest particle size being no greater than 100 microns. Although the particle size is important, the formation of a colloidal suspension is not important so long as the solid plastic additives remain suspended in the liquid carrier.

Numerous types of rheology agents include thickeners, suspending agents etc. and desirably thixotropic agents. Such compounds are known to the art and literature. By way of illustration, it is noted that various fumed silicas such as Cab-O-Sil (made by Cabot Corp.) can be used and that various hydrated silicas such as Hi-Sil (made by PPG Industrial Corp.) can also be used. Additionally, various organic or inorganic derivatives of castor oil constitute a suitable class of thixotropic additives. Another broad class of compounds include organic derivatives of clays. Still another class, suitable for use with aqueous liquid carriers are the various polymeric thickeners. Examples of water soluble polymeric thickeners include polyvinyl alcohol, various polymers made from acrylic acid monomers such as Carbopol (made by B. F. Goodrich Co.) and polymers made from ethylene maleic anhydride monomers such as EMA-91 (made by Monsanto Corp.). Non-aqueous polymers include styrene-butadiene copolymers such as the Kratons (made by Shell) and styrene-isoprene copolymers. Considering the various organic derivatives of castor oil, examples of such commercial compounds include Thixcin R, Thixatrol ST, Rheox 1, Rheox 53 MS, Rheox 53 X, Post-4, and the like. Examples of inorganically modified derivatives of castor oil include Thixcin GR, Thixatrol GST, Thixseal 1084, and the like. All of these compounds are manufactured by NL Industries. Another castor oil derivative is Viscotrol-A (made by Mooney Chemicals, Inc.). Clays modified by quaternary ammonium compounds also produce thixotropic compounds which can be used in the present invention. Such compounds are known to the art and literature.

The organic clays utilized as thixotropic additives are made from clay and preferably a smectite clay platelet having a long chain organic compound bonded to its faces. Such types of additives include Bentone 14, Bentone 27, Bentone 34, Bentone 38, Bentone SA-38, Bentone Gel OMS, Bentone LT, Bentone EW, M.P.A. 1075 and Rheolate 1, and the like, all manufactured by NL Industries.

As noted above, an effective amount of the rheology agent to maintain suspension of the plastic additives is utilized. Naturally the amount will vary depending upon the type of rheology agent, the plastic additive, plastic additive unit particle size thereof and the liquid carrier. Generally, the amount of such rheology or suspending agents ranges from about 0.1% to about 10%, desirably from about 0.1% to about 5% and preferably from about 0.1% to about 3% by weight based upon the weight of the slurry, that is, the liquid carrier, the rheology agent and the plastic additive.

A suspended plastic additive solution is easily formed. Although order of addition is not important, generally the liquid carrier is added to a vessel. Then, a sufficient amount of the rheology agent such as a thixotropic agent is added to the carrier and mixed to produce a desirable concentration therein. Next, the plastic additive such as a process stabilizer is added and the entire solution mixed until the insoluble plastic additive is uniformly dispersed throughout the solution. Oftentimes to aid in the formation of the slurry, the solution can be mildly heated as to approximately 50° C. or less but not greater than the boiling point of the liquid carrier. Sometimes a very small amount of a polar additive such as water with alcohol (e.g. an alkyl alcohol) can also be used to aid in the formation of the slurry. The resulting suspended slurry containing the plastic additive therein has good storage life based upon retention of the slurry level and generally can be stored for long periods of time as for example weeks and even months. Due to the thixotropic nature of the solution or slurry, the plastic additive is suspended in the liquid carrier, yet the slurry can be readily pumped or conveyed and subsequently applied to the desired type of polymer.

Application of the plastic additive slurry to the polymer or treatment thereof can generally be in any conventional manner. For example, the slurry can be sprayed upon the polymer as through a nozzle located over a conveyor belt having the polymer thereon. All that is required is that the apertures of the nozzle be greater than the largest particle of the plastic additive. Another method of application or treatment involves the utilization of a fluidized bed. Still another method or treatment is the utilization of a ribbon mixer wherein the plastic additive slurry is added thereto and is subsequently mixed and uniformly distributed over the polymer. Regardless of the method of application, an efficient and economical treatment is effected. The application is also quite rapid and can occur in a short period of time. Due to the generally volatile nature of the liquid carrier, it readily evaporates thus typically depositing a thin coating of the plastic additive on the surface of the polymer.

The treated polymer generally can be stored for a long or an indefinite period of time. When stored, since it already has the plastic additive coated thereon, it is protected with regard to the function of the plastic additive. Depending upon the type of additive, the polymer is protected from conditions such as heat, ultraviolet exposure, oxidation, ozonation, and the like. The polymer can then be processed in a normal manner such as extrusion, blow molding, calendared, etc., and the finished product is further protected since it contains the additive therein.

The invention will be better understood by reference to the following examples wherein all percentages are by weight unless otherwise indicated.

EXAMPLE 1

(Thixcin R.) To a vessel was added 134 gm (67%) of hexane followed by 6 gm (3%) of Thixcin R. The compounds were mixed for approximately 5 minutes and then 60 gm (30%) of Good-rite 3114X3, and anti-oxidant manufactured by the B. F. Goodrich Company, was added. The Good-rite 3114X3 antioxidant had an average particle size of approximately 10 microns with no particle being greater than 80 microns. The vessel was covered with aluminum foil and heated to approximately 50° C. with mixing. Mixing was continued for approximately 20 minutes at temperatures between 35° to 54° C. using a homogenizing mixer. An aliquot of the well mixed slurry was then transferred into a long tube (1-inch diameter) of approximately 2 ft. in height. The tube was covered with aluminum foil. The height of the slurry was measured for each hour for a period of 24 hours.

EXAMPLE 2

In a manner similar to Example 1, Thixcin GR was used as the rheology additive to produce a 30% solution of Good-rite 3114X3. The percent of the original slurry level after settling for 24 hours is set forth in Table I.

EXAMPLE 3

To a vessel was added 134 gm. (67%) of hexane followed by 6 gm. (3%) of Bentone 34, an organo-clay designed for use in low to medium polarity systems. The compounds were mixed for approximately 5 minutes and then 1.98 gm. of a polar additive (95% water and 5% methyl alcohol) was added and mixed for 5 minutes. Then, 58.02 gm. of Good-rite 3114X3 was added. The ingredients were mixed for approximately 20 minutes using a homogenizer. An aliquot of the well mixed slurry was then transferred to a long tube (1-inch diameter) of approximately 2 feet in height. The tube was covered with aluminum foil and the slurry permitted to settle over a period of 24 hours. The height of the slurry was measured every hour.

EXAMPLES 4-10

In a manner similar to Examples 1 to 3, other rheology additives were utilized to produce a 30% slurry of Good-rite 3114X3. The slurry level after 24 hours is set forth in Table I.

TABLE I

Results of Using Rheology Additives to Suspend Good-rite 3114 × 3 Powder in Hexane
(All Slurries contained 30% by weight of Good-rite 3114 × 3)

| Rheology Additives | Conc. (%) | Retention of Slurry Level (Based on Orig. Slurry Level*) After 24 Hours Settling**(%) |
|---|---|---|
| Thixcin R | 3 | 99.3 |
| Thixcin GR | 3 | 94.8 |
| Bentone 34 | 3 | 98.3 |
| Bentone SD-1 | 3 | 94.6 |
| Bentone 5A38 | 3 | 99.4 |
| Thixcin R | 1 | 86.8 |
| Thixcin GR | 1 | 81.4 |
| Bentone 34 | 1 | 93.8 |
| Bentone SD-1 | 1 | 67.1 |
| Bentone 5A38 | 1 | 64.1 |
| Control (no rheology additive) | | 47.6 |

Thixcin R, Thixcin GR, Bentone 34, Bentone SD-1 and Bentone 5A38 are produced by N. L. Chemicals/NL Industries, Inc. Thixcin R and Thixcin GR are organic derivatives of castor oil. Bentone 34, Bentone SD-1 and Bentone 5A38 are purified organic clays.

As apparent from the above table, fairly good retention was obtained with several of the additives at a slurry retention level in excess of 60% at 1% concentration of the rheology additive. At concentrations of 3%, the slurry retention level was greater than 94%. These levels were much better than the control which only had a 47.6% retention level.

While in accordance with the patent statute a best mode and preferred embodiment has been presented, the invention is not limited thereto, but rather by the scope of the attached claims.

What is claimed is:

1. A method of applying a plastic additive to a polymer; comprising the steps of:
   rheologically suspending the plastic additive in a liquid carrier with an effective amount of a thixotropic agent to form a thixotropic slurry capable of retaining at least 60% of an original slurry level during an initial 24 hour period;
   applying said thixotropic slurry to the polymer, said polymer being a thermoplastic or a thermoset; and
   removing said liquid carrier whereby said polymer contains said plastic additive thereon.

2. A method according to claim 1, wherein said plastic additive is substantially insoluble or partially insoluble in said liquid carrier, wherein said plastic additive is a protective material, a processing agent, an extender, a filler, a reinforcing material, an auxiliary material, a surface material, and combinations thereof.

3. A method according to claim 2, including mixing said thixotropic agent and said plastic additive in said liquid carrier to form said slurry, wherein said polymer is a thermoplastic polymer, and wherein the amount of said plastic additive is from about 1% to about 60% by weight based upon the weight of said slurry.

4. A method according to claim 3, wherein said polymer is an alpha-monoolefin homopolymer, copolymer or terpolymer, an ethylene-propylene copolymer, an ethylene-propylene terpolymer, a polyacetal homopolymer, a polyacetal copolymer, a polyamide, a polyester, a polystyrene, a polycarbonate, a polyvinyl chloride, an ABS copolymer, or combinations thereof, wherein said liquid carrier is an aqueous solution or an organic liquid having a boiling point of about 120° C. or less, and wherein the amount of said rheology agent is such that at least 80% of said original slurry level is retained during a 24-hour period.

5. A method according to claim 4, wherein the amount of said rheology additive is from about 0.1% to about 10% by weight based upon the weight of said slurry, and wherein the amount of said plastic additive is from about 5% to about 50% by weight based upon the weight of said slurry.

6. A method according to claim 5, wherein said plastic additive is an antioxidant; an ultraviolet light stabilizer, inhibitor, or absorber; an antiozonate; a heat stabilizer; a chemical stabilizer; a secondary stabilizer; or combinations thereof; optionally heating said liquid carrier, said thixotropic additive and said plastic additive to form said slurry; and removing said liquid carrier by volatilizing said liquid carrier from said formed slurry.

7. A method according to claim 6, wherein said polymer is polyethylene, polypropylene, or combinations thereof, wherein said rheology additive is an organic derivative of castor oil, an inorganic derivative of castor oil, an organic derivative of a clay, or combinations thereof, wherein the amount of said thixotropic agent ranges from about 0.1% to about 5% by weight based upon the weight of said slurry, and wherein said liquid carrier has a boiling point of 100° C. or less.

8. A method according to claim 5, wherein the average particle size of said plastic additive is 100 microns or less, and wherein said plastic additive is insoluble in said liquid carrier or up to about 30% by weight of said plastic additive is soluble in said liquid carrier.

9. A method according to claim 8, wherein the amount of said thixotropic additive is from about 0.1% to about 5% by weight based upon the weight of said slurry, and wherein said liquid carrier has a boiling point of about 100° C. or less.

10. A method according to claim 9, wherein said average particle size of said plastic additive is 50 microns or less, wherein said plastic additive is insoluble in said liquid carrier or up to about 10% by weight of said plastic additive is soluble in said liquid carrier, wherein the amount of said thixotropic additive is from about 0.1 to about 3% by weight based upon the weight of said slurry, and wherein the amount of said plastic additive is from about 10% to about 40% by weight based upon the weight of said slurry.

11. A method according to claim 10, wherein the boiling point of said liquid carrier is about 70° C. or less, and wherein at least 90% of said original slurry level is retained during a 24-hour period.

12. A method according to claim 3, wherein said plastic additive is an antioxidant, an ultraviolet light stabilizer, a processing stabilizer, or combinations thereof.

13. A method according to claim 12, wherein said liquid is water, an organic alcohol having from 1 to 5 carbon atoms therein, an alkane having from 6 to 12 carbon atoms, an aromatic or an alkyl substituted aromatic compound having from 6 to 14 carbon atoms, wherein said polymer is polyvinyl chloride, polyethylene, polypropylene, an ethylene-propylene copolymer, a copolymer of ethylene and butene-1, or EPDM, wherein said thixotropic agent is an organic derivative of castor oil, an organic derivative of a clay, or combinations thereof, wherein said antioxidant is a phenolic antioxidant, and wherein said ultraviolet light stabilizer is a hindered amine.

14. A method according claim 5, wherein said plastic additive is an antioxidant, an ultraviolet light stabilizer, a processing stabilizer, or combinations thereof.

15. A method according claim 14, wherein said liquid is water, an organic alcohol having from 1 to 5 carbon atoms therein, an alkane having from 6 to 12 carbon atoms, an aromatic or an alkyl substituted aromatic compound having from 6 to 14 carbon atoms, wherein said polymer is polyvinyl chloride, polyethylene, polypropylene, an ethylene-propylene copolymer, a copolymer of ethylene and butene-1, or EPDM, wherein said thixotropic agent is an organic derivative of castor oil, an organic derivative of a clay, or combinations thereof, wherein said antioxidant is a phenolic antioxidant, and wherein said ultraviolet light stabilizer is a hindered amine.

16. A method according to claim 8, wherein said plastic additive is an antioxidant, an ultraviolet light stabilizer, a processing stabilizer, or combinations thereof.

17. A method according to claim 16, wherein said liquid is water, an organic alcohol having from 1 to 5 carbon atoms therein, an alkane having from 6 to 12 carbon atoms, an aromatic or an alkyl substituted aromatic compound having from 6 to 14 carbon atoms, wherein said polymer is polyvinyl chloride, polyethylene, polypropylene, an ethylene-propylene copolymer, a copolymer of ethylene and butene-1, or EPDM, wherein said thixotropic agent is an organic derivative of castor oil, an organic derivative of a clay, or combinations thereof, wherein said antioxidant is a phenolic antioxidant, and wherein said ultraviolet light stabilizer is a hindered amine.

18. A method according to claim 10, wherein said plastic additive is an antioxidant, an ultraviolet light stabilizer, a processing agent, or combinations thereof.

19. A method according to claim 18, wherein said liquid is water, an organic alcohol having from 1 to 5 carbon atoms therein, an alkane having from 6 to 12 carbon atoms, an aromatic or an alkyl substituted aromatic compound having from 6 to 14 carbon atoms, wherein said polymer is polyvinyl chloride, polyethylene, polypropylene, an ethylene-propylene copolymer, a copolymer of ethylene and butene-1, or EPDM, wherein said rheology agent is an organic derivative of castor oil, an organic derivative of a clay, or combinations thereof, wherein said antioxidant is a phenolic antioxidant, and wherein said ultraviolet light stabilizer is a hindered amine.

* * * * *